United States Patent [19]
Whiteside

[11] Patent Number: 5,332,192
[45] Date of Patent: Jul. 26, 1994

[54] FLUSH VALVE FILTER AND BYPASS ORIFICE

[75] Inventor: John F. Whiteside, Franklin Park, Ill.

[73] Assignee: Sloan Valve Company, Franklin Park, Ill.

[21] Appl. No.: 65,705

[22] Filed: May 24, 1993

[51] Int. Cl.⁵ .................. F16K 31/385; F16K 31/145
[52] U.S. Cl. .......................... 251/40; 137/544; 138/40; 251/120
[58] Field of Search .......... 251/38, 40, 45, 46, 251/120, 121; 137/544, 545; 138/40, 41, 42

[56] References Cited

U.S. PATENT DOCUMENTS

| | | | |
|---|---|---|---|
| 1,114,398 | 10/1914 | Sloan | 251/40 |
| 2,270,259 | 1/1942 | Burke | 251/40 |
| 2,776,812 | 1/1957 | Colendar | 251/40 |
| 3,207,467 | 9/1965 | Buhler | 251/40 |
| 3,656,499 | 4/1972 | Nelson et al. | 137/270 |
| 4,261,545 | 4/1981 | Allen | 251/40 |
| 4,817,913 | 4/1989 | Whiteside | 251/40 |
| 4,883,254 | 11/1989 | Whiteside | 251/40 |
| 5,013,007 | 5/1991 | Whiteside | 251/40 |

FOREIGN PATENT DOCUMENTS 111208 8/1940 Australia ................. 251/40

Primary Examiner—George L. Walton
Attorney, Agent, or Firm—Dorn, McEachran, Jambor & Keating

[57] ABSTRACT

A diaphragm-type of flush valve for use with toilet devices such as urinals and water closets has a body with an inlet and an outlet and a valve seat therebetween. There is a valve member movable to a closing position on the valve seat to stop flow between the inlet and the outlet. The valve member includes a diaphragm peripherally attached to the body, a refill ring attached to the diaphragm for controlling water flow to the outlet and a retaining disc which is used to attach the refill ring to the diaphragm. There is a pressure chamber above the diaphragm for holding the valve member on the valve seat. A filter and bypass orifice connect the inlet and the pressure chamber, with the bypass orifice being formed in the retaining disc and the filter being formed in part by a portion of the diaphragm.

16 Claims, 3 Drawing Sheets

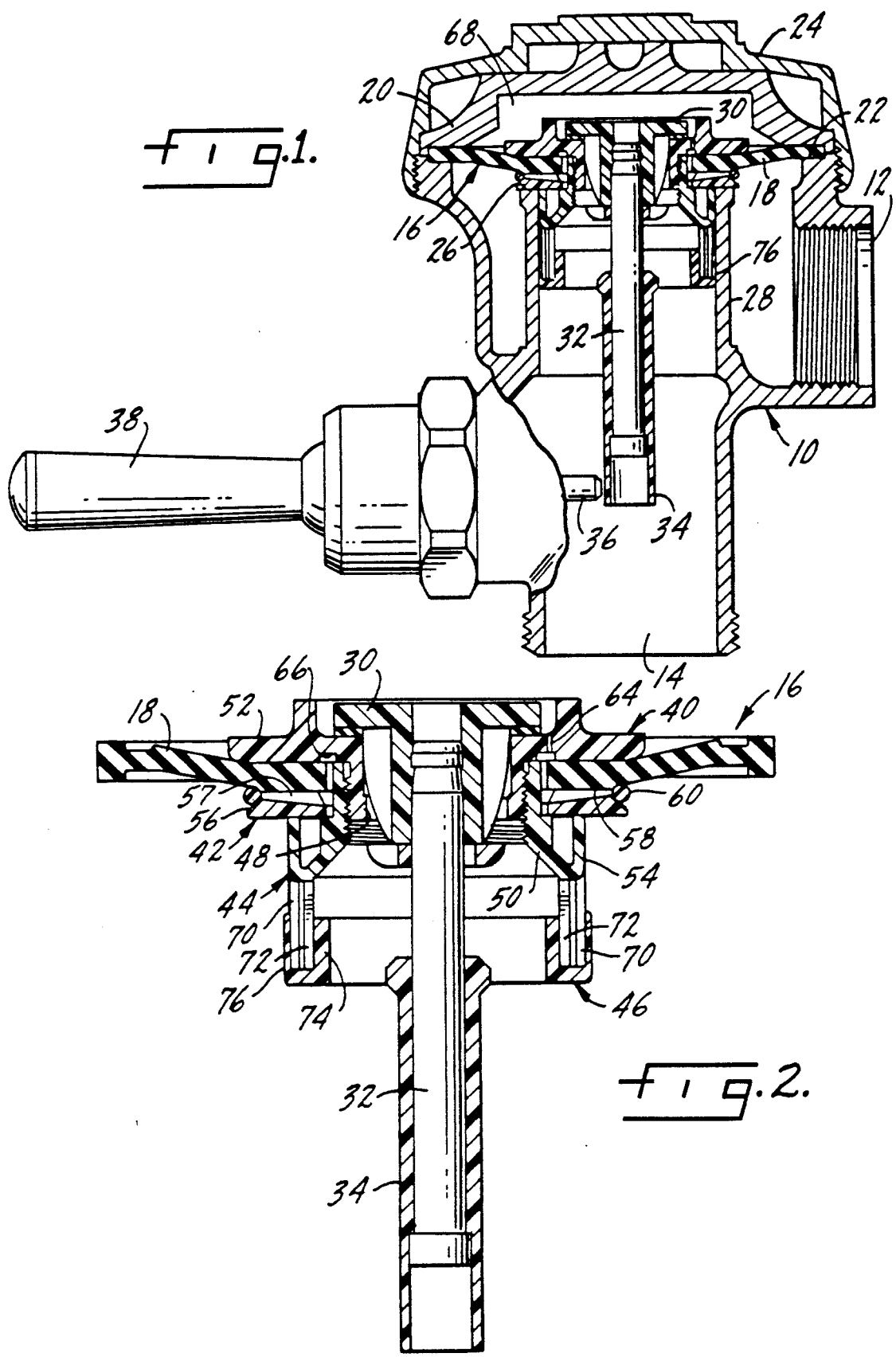

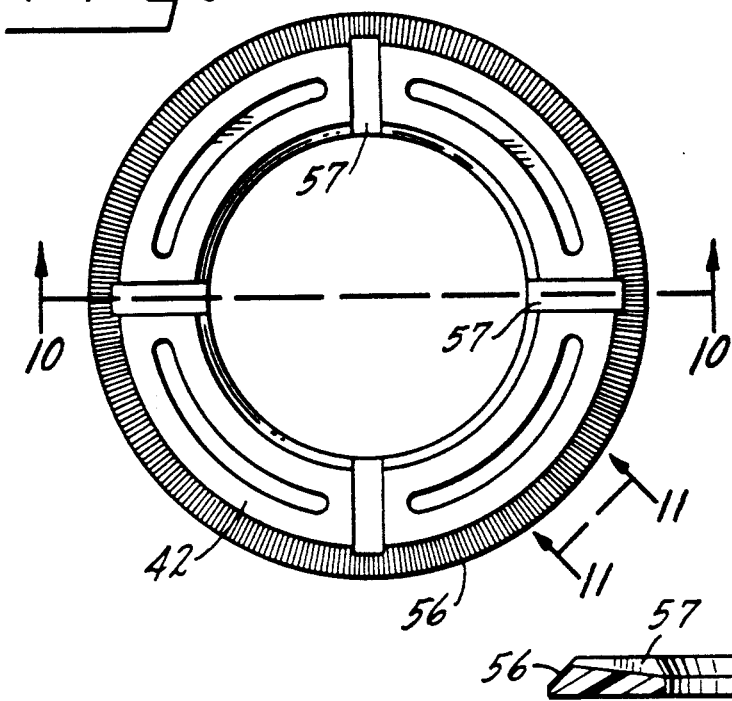
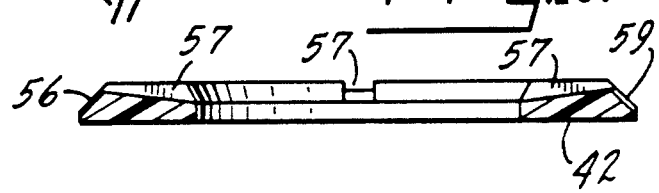
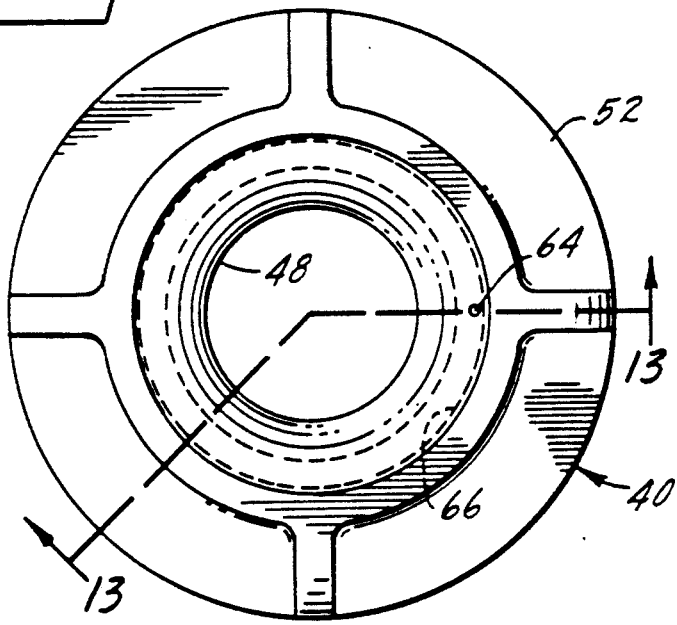
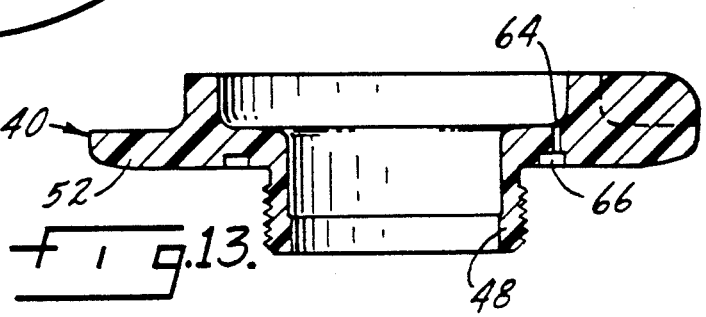

FLUSH VALVE FILTER AND BYPASS ORIFICE

THE FIELD OF THE INVENTION

The present invention relates to flush valves of the type used with toilet devices such as urinals and water closets and particularly to a diaphragm-type flush valve. More specifically, the invention relates to a filter and bypass orifice for a diaphragm flush valve. The bypass orifice, in most prior art constructions, has been a separate element which is inserted in the diaphragm. This is a labor intensive manufacturing step. In the present invention, the bypass orifice is molded into the diaphragm retaining disc, thus eliminating a part and providing substantial economies in manufacture and assembly. The filter, which is upstream of the bypass orifice and is effective to eliminate particles which might clog the bypass orifice has a substantial number of filter passages, generally spread through the 360° circumference of the diaphragm to provide a substantial flow area, with each passage being made small in area to protect the bypass orifice.

SUMMARY OF THE INVENTION

The present invention relates to an improved filter and bypass orifice for use in diaphragm-type flush valves.

A primary purpose of the invention is to provide an improved bypass orifice and filter which results in substantial economies in manufacture.

Another purpose of the invention is to provide a bypass orifice which is molded into one of the parts which retains the diaphragm in the flush valve, eliminating the separate bypass orifice of the prior art.

Another purpose is a filter for use in a diaphragm flush valve as described, which filter has a large flow area made up of a substantial number of small openings to protect the bypass orifice from impurities in the water.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, illustrating a flush valve of the type described;

FIG. 2 is an enlarged section illustrating the diaphragm assembly;

FIG. 9 is a top view of the filter disc;

FIG. 10 is a section along plane 10—10 of FIG. 9;

FIG. 11 is an enlarge section along plane 11—11 of FIG. 9;

FIG. 12 is a top view of the retaining disc; and

FIG. 13 is a section along plane 13—13 of FIG. 12.

DESCRIPTION OF THE PREFERRED EMBODIMENT

Figure 3:
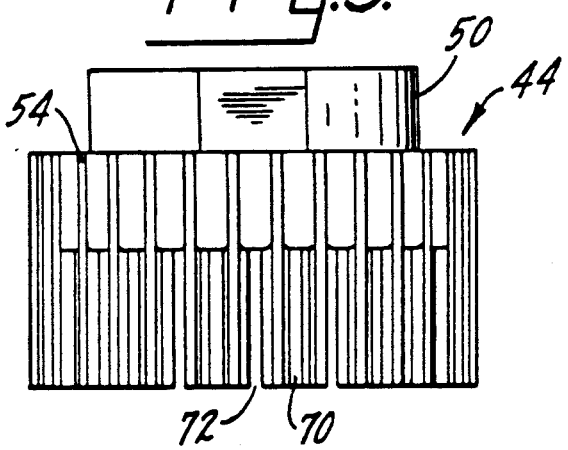
FIG. 3 is a side view of the refill ring.
Figure 4:
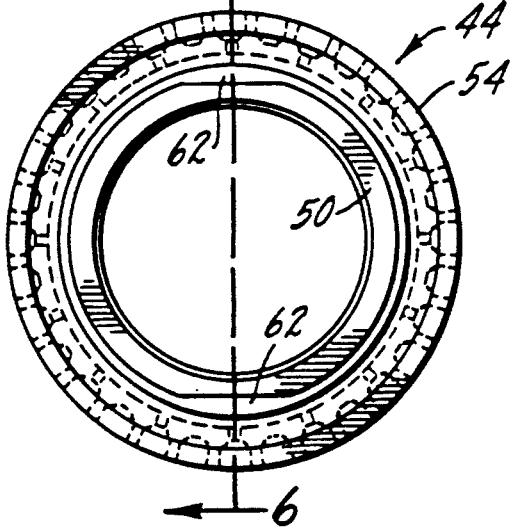
FIG. 4 is a top view of the refill ring.
Figure 5:
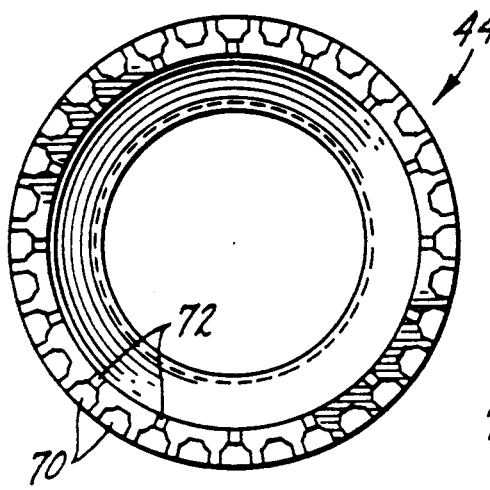
FIG. 5 is a bottom view of the refill ring.
Figure 6:
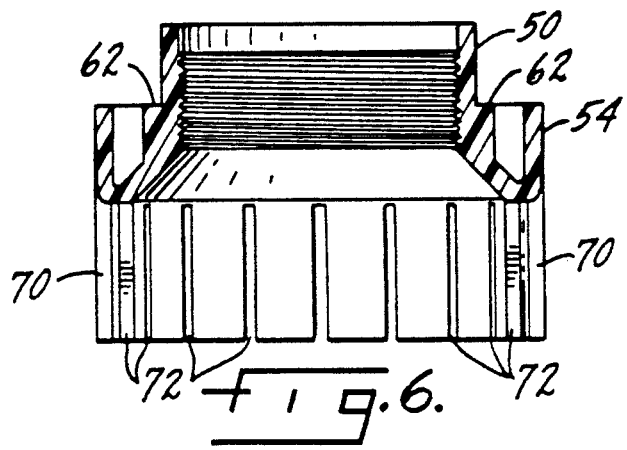
FIG. 6 is a section along plane 6—6 of FIG. 4.
Figure 7:
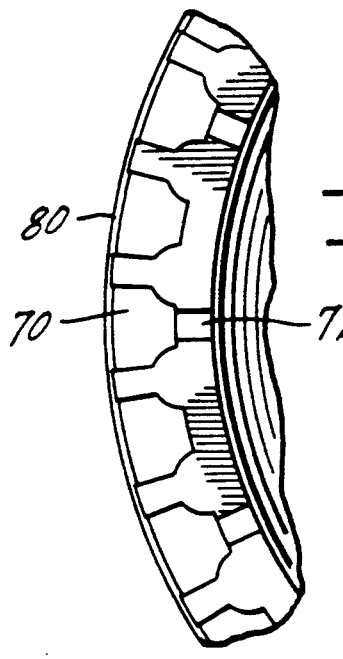
FIG. 7 is an enlarged partial section of the refill ring illustrating the water passages therethrough.

In the drawings, a flush valve of the type manufactured by the assignee of the present application, Sloan Valve Company, of Franklin Park, Ill., and sold under the trademark ROYAL, is shown to include a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screwthreaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes a relief valve 30 having a downwardly-extending stem 32 carrying a movable sleeve 34. Sleeve 34 is positioned for contact by a plunger 36 when operated by a handle 38 as is conventional in the operation of flush valves of the type disclosed.

Focusing specifically on the diaphragm assembly 16, in addition to the diaphragm 18 and the relief valve 30, this assembly includes a retaining disc 40, a filter disc 42, a refill ring 44, and a flow control ring 46. The retaining disc 40 has an inner cylindrical threaded portion 48 which is attached to a mating cylindrical threaded portion 50 on refill ring 44. The described threaded connection clamps diaphragm 18 between an upper portion 52 of the retaining disc and filter disc 42. The refill ring has an upwardly-extending cylindrical portion 54 which bears against the bottom of the filter disc whereby the combination of the refill ring and the retaining disc clamp the diaphragm and filter disc together, thus forming the diaphragm assembly 16.

The upper surface of filter disc 42 has a series of closely spaced circumferentially disposed small grooves 56, which for example may have a depth of 0.012 inch. The upper surface of the retaining disc having grooves 56 faces a lower surface 58 on the diaphragm which forms the upper boundary for the passages formed by the grooves 56. The grooves function as filter passages and are sized to prevent particles carried by the water from passing through the filter and clogging the bypass orifice which will be described hereinafter. An annular seal ring 60 is positioned at the entrance of grooves 56 and is held between the lower surface of the diaphragm and the outward slanted surface 59 of the filter disc. It is the combination of seal ring 60, diaphragm 18, and the passages 56 which form the filter which is positioned upstream of the bypass orifice and will be of a size to prevent particles in the water from clogging the bypass orifice. The circumferentially disposed grooves 56 provide a substantial flow area, but yet one with openings sized to prevent water impurities from clogging the bypass orifice. The filter grooves protect the bypass orifice to insure that it performs its intended function.

Water flowing through grooves 56 to reach the interior of the filter disc will reach the space between the refill ring and the interior of the diaphragm and specifically will flow to two flatted areas 62 formed on the exterior of the cylindrical portion 50 of the refill ring. Although the described embodiment has two flatted areas 62, it is within the scope of the invention to have more than two such areas. The flatted areas 62 provide a waterway which connects the filter passages 56 and the radial grooves 57 with the bypass orifice 64 in the retaining disc. Bypass orifice 64 is in communication with an annular groove 66 in the retaining disc which faces the refill ring and is in communication with the flatted areas 62. Thus, water passes from the filter made up of the individual grooves 56 to the flatted areas on the projection 50 of the refill ring and then to annular groove 66 on the bottom of the retaining disc. Groove 66 connects with the bypass orifice 64 and it is through this series of passages that water reaches the pressure chamber 68 positioned between inner cover 20 and diaphragm assembly 16.

As is known in the art, flush valves of the type disclosed herein require pressure in chamber 68 in order to maintain the diaphragm closed upon its seat 26. Water at inlet 12 will flow through the described filter and bypass to reach chamber 68 and will maintain the diaphragm in the closed position shown.

The refill ring 44 includes a plurality of outwardly facing vertical grooves 70, a portion of which have a passage 72 which connects the grooves 70 with the inside of the refill ring. When the flush valve is operated, the only passage for water to reach the outlet is through passages 72 to grooves 70. The number and size of passages 72 will determine the volume of water which passes in any flushing operation.

Present-day governmental codes strictly control the volume of water which may be used in the operation of a toilet device such as a urinal and water closet and the requirements differ for each such device. Since the valve shown herein may be used on both urinals and water closets, and may be used in areas having different water restrictions, the refill ring passages 72 may be sized to comply with the specific requirements for the location where the valve is to be used. In this connection, it should be noted that the flow control ring 46 has an upwardly-extending annular projection 74 which extends along the inside surface of the refill ring and determines the extent of passages 72 which will be available for water flow. The passages 72 may extend the full length of the refill ring, but the flow control ring and specifically the height of portion 74, determine what portion of the those passages is available for water flow. A change in the size of the flow control ring can therefore change the volume of water which passes in a flushing operation.

The exterior of the refill ring 44 is sized to closely fit the interior of barrel 28. Although the refill ring will raise up with the diaphragm assembly when the flush valve is operated, as described hereinafter, there will always be circumferential contact between the exterior lip 76 of the flow control ring and the interior of the barrel which will cause all of the water to flow through passages 72.

Figure 8:
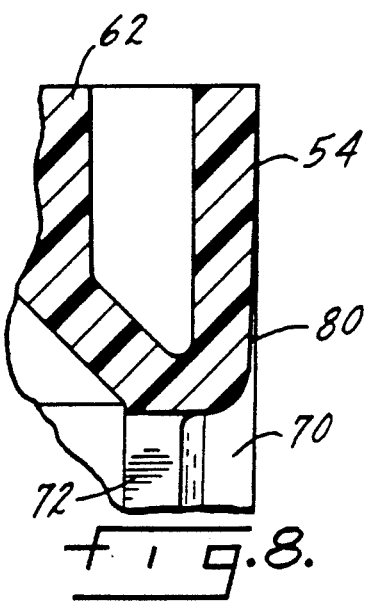
FIG. 8 is an enlarged partial section of the refill ring outer wall.

In operation, pivotal movement of handle 38 causes plunger 36 to contact the sleeve 34 of the relief valve. The relief valve tilts, venting the pressure from chamber 68 down through the interior of the diaphragm. This permits the diaphragm to raise up from its seat, pulling the diaphragm assembly upward, connecting the inlet 12 to the outlet 14 through the described passages 72 in the refill ring. As soon as the valve has been operated, the bypass orifice immediately begins to recharge chamber 68. When the chamber has been sufficiently pressurized, the diaphragm assembly will move toward closing upon its seat 26. As it so moves it will throttle and then ultimately close off the flow of water between the inlet and the outlet. As particularly shown in FIG. 8, the exterior of the refill ring has a slightly inward canted surface indicated at 80 such that the closure of the refill ring as it moves into the barrel will control the back pressure in the valve. Back pressure is necessary to control the rate of closure and to provide for a relatively quick closure of the valve. The number of gallons of water that will pass through the valve on a flush will be to a degree determined not only by the flow through the refill orifice, but also by the rate of closure of the valve as the refill ring moves into the barrel. The desired result is for the flow through the valve during a single operation to be independent of the water pressure applied at the inlet. This can be brought about by controlling the back pressure which is determined by the flow control angle which is the angle formed between the canted surface 80 at the exterior of the refill ring and the axial surface of barrel 28.

Whereas the preferred form of the invention has been shown and described herein, it should be realized that there may be many modifications, substitutions and alterations thereto.

The embodiments of the invention in which an exclusive property or privilege is claimed are defined as follows:

1. A diaphragm-type of flush valve for use with toilet devices such as urinals and water closets including a body having an inlet and an outlet, a valve seat between said inlet and outlet and a valve member movable to a closing position on said valve seat to stop flow between said inlet and outlet, said valve member including a diaphragm peripherally attached to said body, a refill ring attached to said diaphragm for controlling water flow to said outlet, and a retaining disc attaching said refill ring to said diaphragm, a pressure chamber above said diaphragm for holding said valve member on said valve seat, a filter and bypass orifice connecting said inlet and pressure chamber, said bypass orifice being formed in said retaining disc and said filter being formed in part by a portion of said diaphragm.

2. The flush valve of claim 1 further characterized by and including a filter disc positioned adjacent said diaphragm and cooperating therewith to define a plurality of sized filter passages, said passages being in communication with said bypass orifice.

3. The flush valve of claim 2 further characterized in that said sized filter passages extend circumferentially about said diaphragm.

4. The flush valve of claim 3 further characterized in that said filter disc is located beneath said diaphragm and is held between said refill ring and diaphragm.

5. The flush valve of claim 4 further characterized in that said filter disc has a circumferential surface facing said diaphragm and in contact therewith, said filter disc surface having a plurality of spaced grooves therein, which grooves define said sized filter passages.

6. The flush valve of claim 4 further characterized by and including a seal ring located between said diaphragm and filter disc at the entrance to said passages.

7. The flush valve of claim 2 further characterized by and including passage means in said refill ring connecting said filter passages and bypass orifice.

8. The flush valve of claim 7 further characterized by and including an annular groove in said retaining disc facing said refill ring and in communication with said refill ring passage means, said groove being in communication with said bypass orifice.

9. A valve member assembly for use in a toilet device flush valve for closing upon a seat thereof including a diaphragm, a refill ring attached to the diaphragm for controlling water flow between the flush valve inlet and outlet, and a retaining disc attaching said refill ring to said diaphragm, a filter and bypass orifice formed in the valve member assembly for use in connecting the flush valve inlet and a flush valve pressure chamber above the valve member assembly to cause movement thereof to a valve closing position, said bypass orifice being formed in said retaining disc and said filter being formed in part by a portion of said diaphragm.

10. The valve assembly of claim 9 further characterized by and including a filter disc positioned adjacent said diaphragm and cooperating therewith to define a plurality of sized filter passages, said passages being in communication with said retaining disc bypass orifice.

11. The valve assembly of claim 10 further characterized in that said sized filter passages extend circumferentially about said diaphragm.

12. The valve member assembly of claim 11 further characterized in that said filter disc is located beneath said diaphragm and is held between said refill ring and said diaphragm.

13. The valve member assembly of claim 12 further characterized in that said filter disc has a circumferential surface facing said diaphragm and in contact therewith, said filter disc surface having a plurality of spaced grooves therein which define said sized filter passages.

14. The valve member assembly of claim 12 further characterized by and including a seal ring located between said diaphragm and filter disc at the entrance of said passages.

15. The valve member assembly of claim 10 further characterized by and including passage means in said refill ring connecting said filter passages and said bypass orifice.

16. The valve member assembly of claim 15 further characterized by and including an annular groove in said retaining disc facing said refill ring and in communication with said refill ring passage means, said groove being in communication with said bypass orifice.

* * * * *